United States Patent

Schinkitz

(10) Patent No.: US 6,827,860 B2
(45) Date of Patent: Dec. 7, 2004

(54) METHOD FOR ELIMINATING NICKEL IONS AND LEAD IONS FROM FERROUS SALT SOLUTIONS

(75) Inventor: Dieter Schinkitz, Leverkusen (DE)

(73) Assignee: Kronos Titan GmbH & Co. OHG (DE)

( * ) Notice: Subject to any disclaimer, the term of this patent is extended or adjusted under 35 U.S.C. 154(b) by 127 days.

(21) Appl. No.: 10/257,162

(22) PCT Filed: May 8, 2001

(86) PCT No.: PCT/EP01/05178

§ 371 (c)(1),
(2), (4) Date: Oct. 8, 2002

(87) PCT Pub. No.: WO01/86010

PCT Pub. Date: Nov. 15, 2001

(65) Prior Publication Data

US 2003/0075510 A1 Apr. 24, 2003

(30) Foreign Application Priority Data

Oct. 5, 2000 (DE) ......................................... 100 22 867

(51) Int. Cl.[7] .......................... C01G 9/00; C01G 19/00
(52) U.S. Cl. ...................... 210/723; 210/724; 210/726; 423/87; 423/82; 423/92; 423/101
(58) Field of Search ................................ 210/716, 726, 210/723, 724, 912; 423/1, 87, 82, 92, 101

(56) References Cited

U.S. PATENT DOCUMENTS

| | | | | |
|---|---|---|---|---|
| 3,655,344 A | * | 4/1972 | Mitchell et al. | 23/299 |
| 3,740,331 A | * | 6/1973 | Anderson et al. | 210/726 |
| 4,102,784 A | * | 7/1978 | Schlauch | 210/716 |
| 4,503,017 A | * | 3/1985 | Gadd et al. | 423/87 |
| 4,579,721 A | * | 4/1986 | Friedman | 423/66 |
| 5,407,650 A | * | 4/1995 | Hartmann et al. | 423/50 |

* cited by examiner

*Primary Examiner*—Duane Smith
*Assistant Examiner*—Minh-Chau T. Pham
(74) *Attorney, Agent, or Firm*—Rodney T. Hodgson

(57) ABSTRACT

Nickel and lead ions are eliminated from an acidic concentrated iron(II) salt solution by adding an alkali sulfide and precipitating nickel and lead sulphides.

24 Claims, No Drawings"

METHOD FOR ELIMINATING NICKEL IONS AND LEAD IONS FROM FERROUS SALT SOLUTIONS

CROSS REFERENCE TO RELATED APPLICATIONS

This application claims priority to PCT Application Number PCT/EP 01/05178 filed May 8, 2001, published as WO 01/86010 A1, and German Application Number 100 22 867.4 filed May 10, 2000.

FIELD OF THE INVENTION

The field of the invention is the field of purifying water by removing heavy metal ions. In particular, the field is eliminating nickel and lead ions from iron(II) salt solutions.

BACKGROUND OF THE INVENTION

Heavy-metal ion concentrations in solutions are generally reduced (ie the solution is purified) by chemical precipitation of the corresponding hydroxides or carbonates. On the industrial scale, however, the purification effect expected on the basis of the low solubility product is often not achieved for a variety of reasons. The influencing factors are the time (incompleteness of the reaction), the content of other substances present in the solution (their "ionic strength"), possible complex-forming reactions (conversion into compounds of higher solubility) and, above all, the handling properties of the precipitates (e.g. their filterability).

The precipitation of heavy-metal ions in the form of heavy-metal sulfides is generally also possible, and sometimes also preferred, since the solubility of the sulfides is often sufficiently low even in the acidic range (see, for example, B. D. Bhattacharyya et al., Precipitation of heavy metals with sodium sulfide: Bench-scale and full-scale experimental results, American Institute of Chemical Engineers Symposium Series 209, Vol. 77 (1981) 31–38). However, it is pointed out in L. Bauch et al., Elimination von Blei und Nickel aus salzreichen Wässern durch Sulfidällung und Flockung {Elimination of lead and nickel from salt-rich waters by sulfide precipitation and flocculation}, Vom Wasser, 75, 375–392 (1990) that the low residual concentrations to be expected on the basis of the thermodynamic data are virtually unattainable, particularly for nickel in acidic salt-rich waste water. No prior art documents show substantial removal of nickel and lead sulfide precipitates under such conditions.

OBJECTS OF THE INVENTION

It is an object of the invention to produce an industrial-scale method for the extensive elimination of lead and nickel ions from iron salt solutions, where the iron ions are predominantly in bivalent state. In this context, "extensive" is taken to mean that a value below 30 mg per liter is reliably achieved for nickel and below 7.5 mg per liter for lead, but that as little dissolved iron as possible is precipitated at the same time.

The object is solved by a method for the elimination of nickel and lead ions from iron(II) solutions by precipitation and separation of the corresponding sulfides, characterised in that an alkali sulfide is added at a super-stoichiometric rate in the acidic range and the precipitate filtered off after a residence time.

SUMMARY OF THE INVENTION

The invention is a method for the elimination of nickel and lead ions from high concentration iron(II) acidic solutions by adding an alkali sulfide, waiting a residence time, and filtering off the nickel and lead precipitate.

DETAILED DESCRIPTION OF THE INVENTION

Contrary to previous experience, it is possible in this way to purify iron(II) salt solutions economically and reliably on an industrial scale. Nickel ion contents of below 30 mg/l are also achieved in saturated iron(II) solutions. In Germany, for example, these values are prescribed by law for the use of iron(II) salt solutions in water treatment.

The method according to the invention cannot be applied to relatively "pure" aqueous solutions with a low lead and nickel ion content. A sufficiently high content of iron(II) ions, for example even up to the point of saturation, is required for the method of the invention. Such high iron content solutions occur for the industrial processes of pickling steel or leaching the cyclone dust occurring when manufacturing titanium dioxide by the chloride process.

Industrial iron(II) salt solutions of this kind always contain iron(III) ions—though often at a low level. They are precipitated sooner than the iron(II) ions, even in the acidic range, and appear to act as "sulfide carriers" for dissolved nickel in a reaction chain. This (slowly formed) $Ni_2S_3$ (with an extremely low solubility product) is removed from the solution, and this slowness of the reaction is probably the reason for the very long residence time in the region of one hour, which is absolutely essential.

Aqueous solutions of sodium hydrogen sulfide or sodium sulfide are particularly suitable as precipitants. As a result of the high iron concentration, no hydrogen sulfide is released under the conditions of the reaction. A typical "contaminated" iron(II) chloride solution of cyclone dust, such as that occurring in the production of titanium dioxide by the chloride process, has the following composition: 8.8% by weight Fe, 1.61% by weight Mn, 2.6% by weight HCl, 410 ppm Ti, 1170 ppm Cr, 2420 ppm V, 580 ppm Nb, 1146 ppm Zr, 95 ppm Ni, 16 ppm Pb. Selective precipitation with a limestone powder suspension (such as described in DE 42 43 559 A1) at a pH value in the region of 3 precipitates the trivalent heavy metals and those of higher valence, especially chromium, vanadium, titanium and zirconium in the form of hydroxides that are filtered off. The heavy-metal ions not affected by hydroxide precipitation and remaining in solution encompass the entire nickel and lead of the original solution, meaning that a solution pre-purified in accordance with DE 42 43 959 A1 exceeds the limit values prescribed by German law.

According to the invention, the necessary reduction in the nickel and lead concentration is successfully achieved by metering alkali sulfide into the (saturated) iron(II) salt solution (roughly 8.5% by weight Fe) following preliminary neutralisation, preferably with dolomite powder, i.e. still in the acidic range at about pH 3. In a typical set-up, an iron solution (16 m³ batch) pre-neutralised with limestone powder is drained into a tank and 100 liters alkali sulfide solution (14%) are added continuously during this time. The amount of alkali sulfide to be added is determined empirically beforehand and retained. Referred solely to the total of nickel and lead, the quantity of added alkali sulfide is super-stoichiometric. However, as the jointly precipitated iron(II) ions (and partially also manganese) have to be taken into consideration, the stoichiometric surplus lies within tight limits. After addition of the sulfide, a residence time of one hour is required to complete precipitation. This is followed by filtration of the heavy-metal sulfides, along with the heavy-metal hydroxides, which can be effectively performed using a membrane filter press. The filtrate from the filter press of the now purified iron(II) chloride solution contains nickel and lead in concentrations that satisfy the requirements prescribed by law. One major advantage of this method is that the very good filterability of "spherical" hydroxides, as illustrated in DE 42 43 559 A1, is not impaired by sulfide precipitation.

If NaHS in bags is used as the starting material, the occurrence of an odor nuisance due to hydrogen sulfide during preparation of the alkali sulfide solution is more likely than when using $Na_2S$ in bags. The results are presented in detail in Table 1. As the purification effect is comparably good in both cases, the plant trials speak in favor of the use of $Na_2S$ flakes.

TABLE I

| Solution of: | NaHS | $Na_2S$ |
|---|---|---|
| Quantity added per 200 t batch | 11.6 kg (equivalent to 600 ppm NaHS, 70–72%) | 20 kg (equivalent to 1000 ppm $Na_2S$, 60–62%) |
| Mean sulfide ion content [ppm] | 240 | 246 |
| Ni content of starting samples [mg/mol Fe] | 35–50 | 35–50 |
| Pb content of starting samples [mg/mol Fe] | 6.6–8.4 | 6.6–8.4 |
| Mean Ni content after elimination [mg/mol Fe] | 16 | 7.5 |
| Mean Pb content after elimination [mg/mol Fe] | 4.9 | 4.7 |

The publications, patents, and patent applications referenced above are hereby incorporated by reference, including their included references.

Obviously, many modifications and variations of the present invention are possible in light of the above teachings. It is therefore to be understood that, within the scope of the appended claims, the invention may be practiced otherwise than as specifically described.

I claim:

1. A method for eliminating nickel and lead ions from an iron(II) salt solution, comprising:
   a) adding an alkali sulfide to a concentrated iron(II) salt solution, wherein the iron(II) salt solution is in the acidic range; then
   b) waiting a residence time sufficient for substantial precipitation of nickel and lead sulphides; then
   c) separating nickel and lead sulfide precipitates from the solution.

2. The method of claim 1, where the concentrated iron(II) salt solution is obtained by leaching the cyclone dust occurring in the manufacture of titanium dioxide by the chloride process.

3. The method of claim 2, where the pH of the concentrated iron(II) salt solution is less than 3.5.

4. The method of claim 2, where the alkali sulfide added is sodium sulfide.

5. The method of claim 4, wherein the quantity of alkali sulfide added for a saturated iron(II) solution is in the range of 600 to 1000 ppm.

6. The method of claim 5, wherein the residual nickel content after sulfide precipitation is below 30 mg per liter iron salt solution.

7. The method of claim 5, wherein the residual lead content after sulfide precipitation is below 7.5 mg per liter iron salt solution.

8. The method of claim 1, where the concentrated iron(II) salt solution is a steel-pickling solution.

9. The method of claim 8, where the pH of the concentrated iron(II) salt solution is less than 3.5.

10. The method of claim 9, where the alkali sulfide added is sodium sulfide.

11. The method of claim 10, wherein the quantity of alkali sulfide added for a saturated iron(II) solution is in the range of 600 to 1000 ppm.

12. The method of claim 11, wherein the residual nickel content after sulfide precipitation is below 30 mg per liter concentrated iron salt solution.

13. The method of claim 11, wherein the residual lead content after sulfide precipitation is below 7.5 mg per liter concentrated iron salt solution.

14. The method of claim 1, where the pH range of the concentrated iron(II) salt solution is between 3 and 3.5.

15. The method of claim 1, where the alkali sulfide added is sodium hydrogen sulfide.

16. The method of claim 1, where the alkali sulfide added is sodium sulfide.

17. The method of claim 1, where the alkali sulfide is added at a super-stoichiometric rate.

18. The method of claim 1, where alkali sulfide is added in the form of an aqueous solution.

19. The method of claim 1, wherein the quantity of alkali sulfide added for a saturated iron(II) solution is in the range of 600 to 1000 ppm.

20. The method of claim 1, wherein the residence time is in the range of 1 hour.

21. The method of claim 1, wherein the residual nickel content after sulfide precipitation is below 30 mg per liter iron salt solution.

22. The method of claim 1, wherein the residual lead content after sulfide precipitation is below 7.5 mg per liter iron salt solution.

23. The method of claim 1, wherein concentrated iron salt solution is saturated with iron.

24. The method of claim 1, wherein the nickel and lead precipitates are separated from the solution by filtering the solution.

* * * * *